Aug. 28, 1962 W. M. GOLDEN 3,051,251
SOD CUTTING AND ELEVATING APPARATUS
Filed Feb. 5, 1960 3 Sheets-Sheet 1
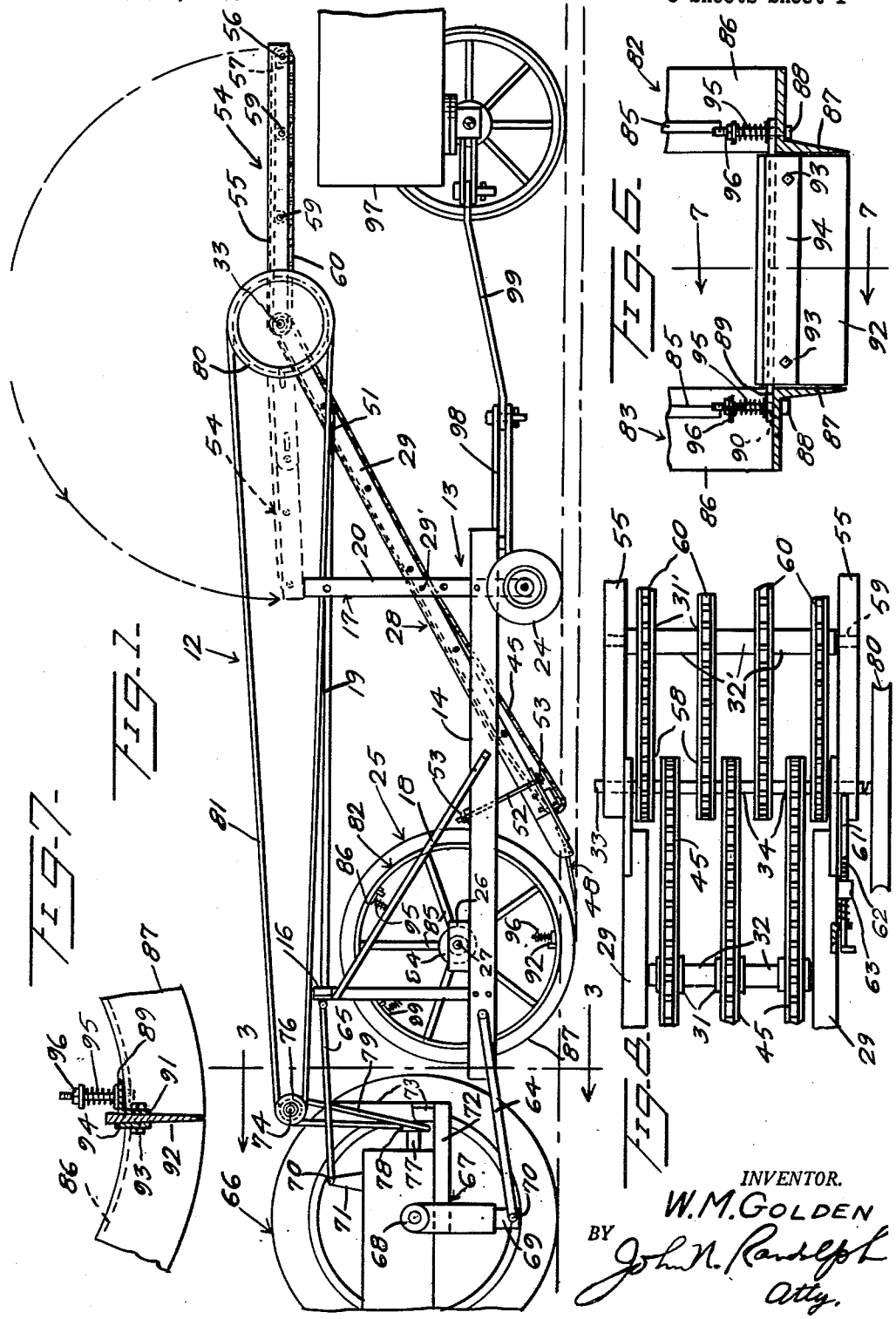
INVENTOR.
W. M. GOLDEN
BY John N. Randolph
Atty.

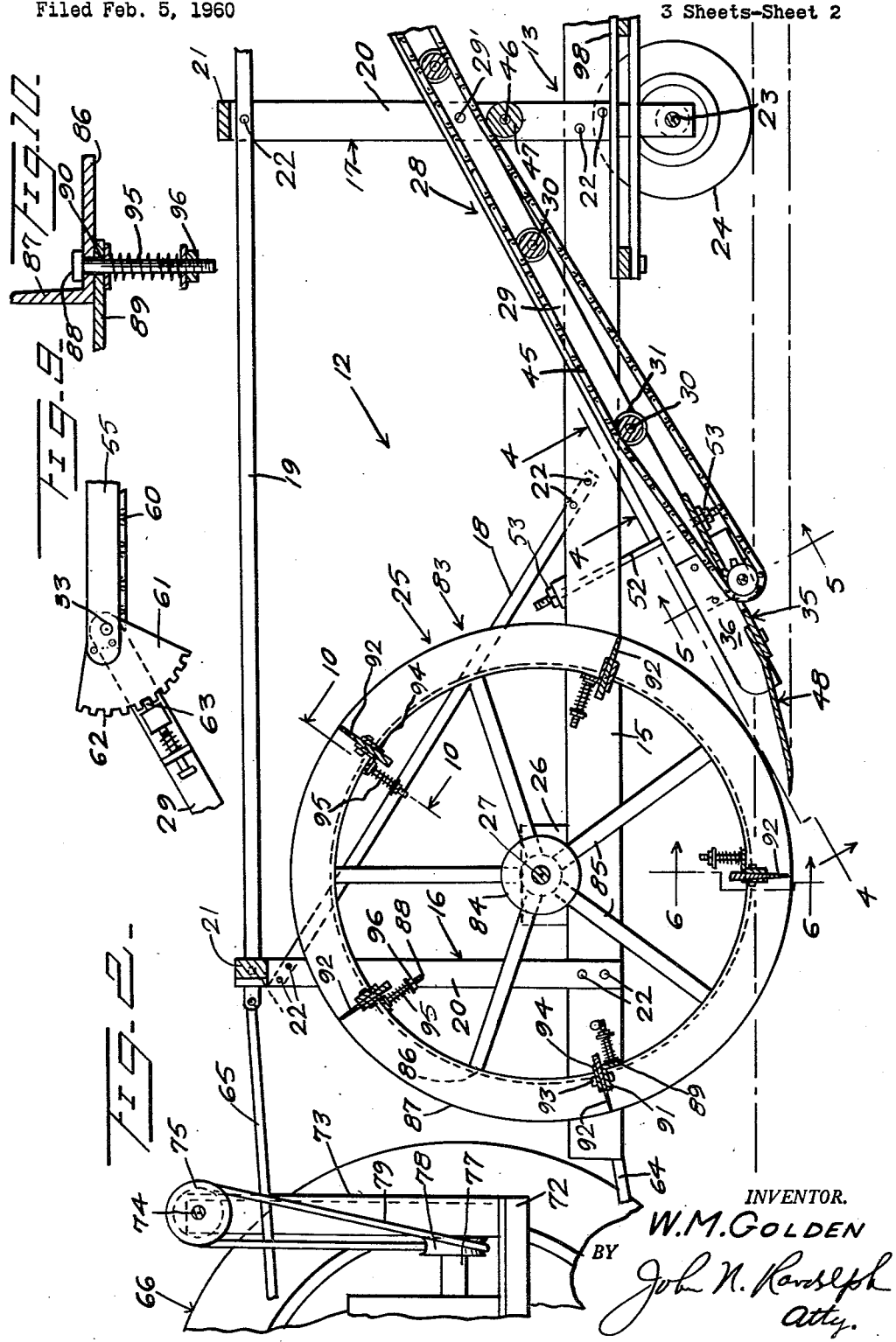

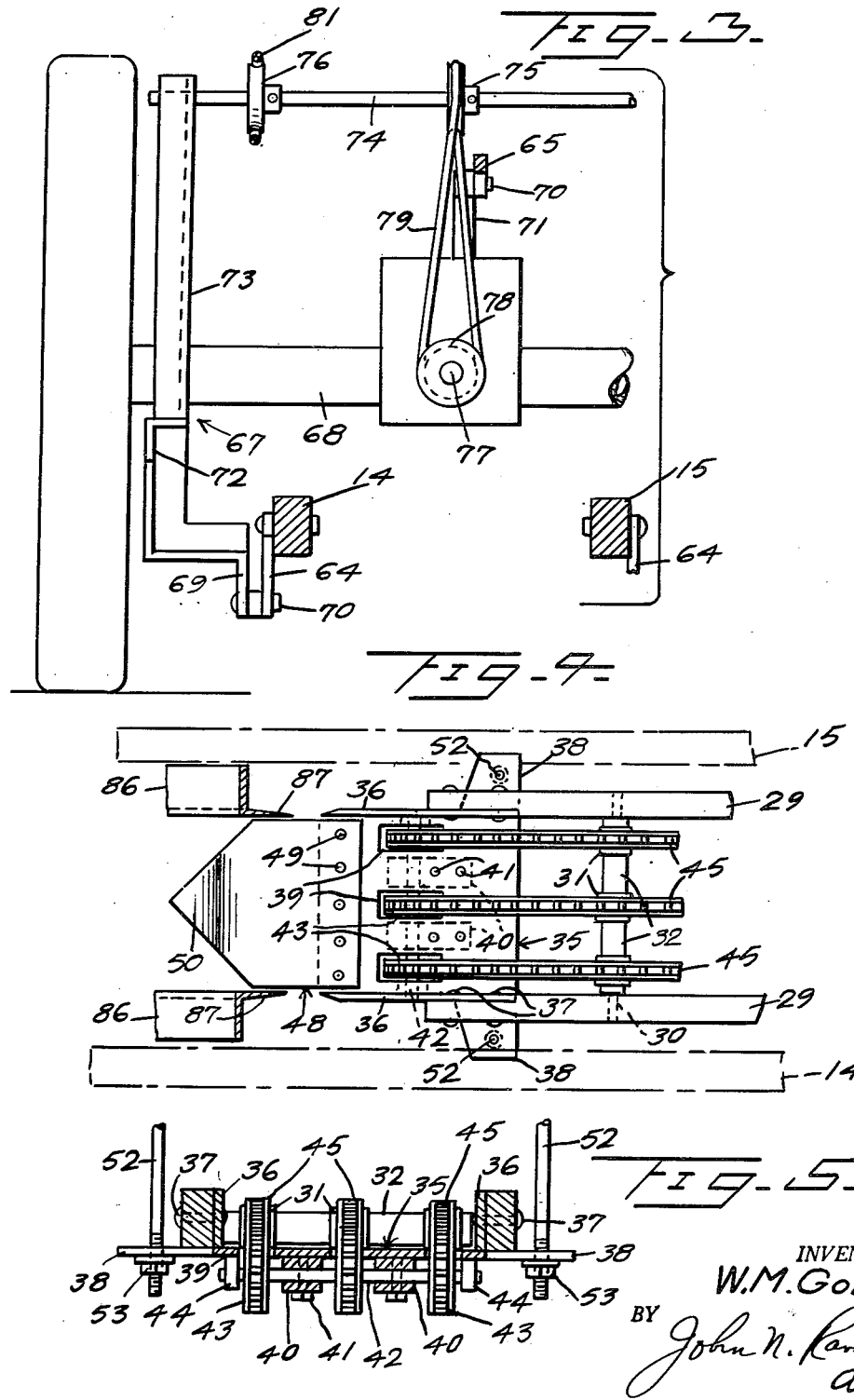

United States Patent Office 3,051,251
Patented Aug. 28, 1962

3,051,251
SOD CUTTING AND ELEVATING APPARATUS
Whitely M. Golden, Springville, Pa.
Filed Feb. 5, 1960, Ser. No. 6,936
3 Claims. (Cl. 172—20)

This invention relates to an apparatus or machine adapted to be coupled to and drawn behind a tractor or similar draft vehicle for cutting, elevating and conveying sod and for ultimately discharging the sod from an elevated part of the machine into a wagon or other carrier, drawn behind the apparatus.

Another object of the invention is to provide a machine or apparatus of the aforedescribed character including a driven endless conveyor for elevating the cut sod and which may be driven from a power takeoff unit of the tractor or draft vehicle.

A further object of the invention is to provide a machine which will accurately and efficiently cut sod in pieces of uniform width and length and also of uniform thickness.

A further object of the invention is to provide a sod cutting and elevating machine having a front supporting wheel of unique construction which is capable of cutting sod into pieces of uniform length and width and which additionally compresses and holds the sod on either side of the cut strip while the cut strip is being lifted.

Various other objects and advantages of the invention will hereinafter become more fully apparent from the following description of the drawings, illustrating a presently preferred embodiment thereof, and wherein:

FIGURE 1 is a side elevational view of the sod cutting and elevating machine, including a part of a tractor behind which the machine is attached and a part of a wagon which is coupled to and drawn behind the machine;

FIGURE 2 is an enlarged fragmentary longitudinal sectional view of the machine and including a fragment of the tractor;

FIGURE 3 is an enlarged fragmentary cross sectional view, taken substantially along a plane as indicated by the line 3—3 of FIGURE 1;

FIGURE 4 is an enlarged fragmentary horizontal sectional view, taken substantially along the line 4—4 of FIGURE 2;

FIGURE 5 is an enlarged fragmentary transverse sectional view, taken substantially along the plane as indicated by the line 5—5 of FIGURE 2;

FIGURE 6 is a fragmentary transverse sectional view, on an enlarged scale, taken approximately along the line 6—6 of FIGURE 2;

FIGURE 7 is a fragmentary vertical sectional view, taken approximately along a plane as indicated by the line 7—7 of FIGURE 6;

FIGURE 8 is an enlarged fragmentary top plan view of a portion of the elevator of the apparatus;

FIGURE 9 is a fragmentary side elevational view on an enlarged scale of a part of the elevator, and FIGURE 10 is an enlarged fragmentary transverse sectional view, on an enlarged scale, taken approximately along a plane as indicated by the line 10—10 of FIGURE 2.

Referring more specifically to the drawings, the sod cutting and elevating apparatus or machine in its entirety and comprising the invention is designated generally 12 and includes a frame, designated generally 13.

The frame 13 is primarily composed of two transversely spaced side frame members 14 and 15, a front arch member 16, a rear arch member 17, a pair of diagonal braces 18 and a pair of longitudinal braces 19. Each of the arch members 16 and 17 includes spaced uprights 20 which are rigidly connected together at their upper ends by a cross member 21. The uprights 20 of the front arch 16 have their lower ends secured by fastenings 22 to the side members 14 and 15, adjacent the forward ends of said side members. The uprights 20 of the rear arch member 17 are secured by fastenings 22 to the frame members 14 and 15, near the rear ends of said frame members, as seen in FIGURE 1. The uprights 20 of the rear arch 17 extend below the frame sides 14 and 15 and have stub axles 23 fixed to and projecting outwardly therefrom and providing journals for a pair of rear ground engaging wheels 24 of the machine 12. The frame sides 14 and 15 are rigidly maintained relative to one another by the arch members 16 and 17. The diagonal braces 18 have lower ends secured by fastenings 22 to the frame sides 14 and 15, midway between the two arch members, and said braces 18 extend upwardly and forwardly and have forward ends secured by additional fastenings 22 to the upper portions of the uprights 20 of the front arch member 16. The longitudinal braces 19 extend from the front arch member 16 to beyond the rear arch member 17 and are secured by additional fastenings 22 to the upper portions of complementary uprights 20 of the two arch members, so that said longitudinal braces are likewise disposed in spaced apart substantially parallel relation to one another.

Transversely aligned bearings 26 are mounted on and secured to the frame sides 14 and 15, behind and adjacent the front arch member 16 to support and journal an axle 27. A large front ground engaging wheel 25 is secured to the axle 27 and disposed for rotation between the frame sides 14 and 15 and within the arch 16. Said wheel 25 provides the front supporting wheel of the machine 12. The unique construction and operation of the wheel 25 will hereinafter be more fully described.

An elevator, designated generally 28, includes a pair of corresponding elongated side frame members 29 which extend upwardly and rearwardly at an incline from behind the front wheel 25 to behind the rear end of the frame 13, as seen in FIGURE 1, and which frame members 29 are disposed between the frame sides 14 and 15 and between the uprights 20 of the arch member 17. The frame members 29 are connected intermediate of their ends each by a single fastening 29′ to the adjacent upright 20 of the rear arch member 17. A plurality of shafts 30 extend between and are supported by the frame members 29 and three grooved idler rollers 31 are journaled on each shaft 30, as best seen in FIGURE 2, between spacing members 32, as best seen in FIGURES 4 and 8. A shaft 33 extends through and is journaled in the upper rear ends of the frame members 29 and has three sprocket wheels 34 fixed thereto, as seen in FIGURE 8. The sprocket wheels 34 align with the grooved rollers 31.

As best seen in FIGURES 4 and 5, a plate forming a frog 35 is disposed beneath and extends from the lower forward ends of the frame members 29, beyond the forwardmost cross shaft 30. The frog 35 has upstanding substantially parallel sides 36, rear portions of which bear against the adjacent sides of the frame members 29 and are secured thereto by fastenings 37 for attaching the frog to the frame members 29. The rear end of the frog 35 is widened to provide wing members 38 which extend outwardly from the frame members 29, as seen in FIGURES 4 and 5. The frog 35 is provided, midway of its front and rear ends, with transversely spaced longitudinally elongated openings 39. Bearings 40, of a self-lubricating type, are secured to the underside of the frog 35 by fastenings 41 and are disposed between the openings 39 to provide journals for a shaft 42. Three sprocket wheels 43 are fixed to the shaft 42 and extend partially through the openings 39, and align with the rollers 31. The frog 35 may be provided with additional bearings 44 for receiving the ends of the shaft 42, beyond the two outermost sprocket wheels 43. The elevator 28 additionally includes three endless chains 45 which are trained over complementary sprocket wheels 34 and 43. The upper flights of the chains 45 engage in and are supported by the grooved rollers 31 between the sprocket wheels 34 and 43. A shaft 46 extends between and is supported by the uprights 20 of the arch member 17 and has a roller 47 journaled thereon and which is disposed beneath and adjacent the frame members 29 for supporting the intermediate portions of the bottom flights of the chains 45 and for maintaining said bottom flights in engagement with at least one of the grooved rollers 31, as seen in FIGURE 2.

A scoop or shovel blade 48, as best seen in FIGURE 4, has a rear portion overlying the forward portion of the frog 35 and which is detachably secured thereto by fastenings 49. The rear portion of the blade 48 is of a width only slightly less than the spacing between the side walls or flanges 36. The blade 48 has a tapered and sharpened forward cutting end 50 which is curved upwardly to assume a substantially horizontal position, as seen in FIGURE 2.

The rear ends of the longitudinal braces 19 are preferably secured by fastenings 51 to the frame members 29 for supporting the upper rear end of the elevator 28. The forward end of the elevator 28 is supported by long bolts 52 which extend slidably through the side frame members 14 and 15 and through the apertures of the wing portions 38. Said bolts 52 have threaded ends receiving nuts 53 which engage above the frame members 14 and 15 and beneath the wing portions 38. The frame members 29 and the rear portions of the braces 19 can yield sufficiently so that by adjustment of the nuts 53 the blade end 50 can be raised and lowered to a limited extent for varying the thickness of the sod cut by said blade, as will hereinafter be more fully described.

The elevator 28 is provided with an angularly adjustable extension 54 including side frame members 55 having corresponding ends which straddle the upper ends of the frame members 29 and which are swingably mounted on end portions of the shaft 33. A shaft 56 extends through and is journaled in the opposite outer end of the members 55 and has four sprocket wheels 57 fixed thereto and which align with four sprocket wheels 58 on the shaft 33. The sprocket wheels 58 are fixed to the shaft 33 and are alternately arranged relative to the sprocket wheels 34. A plurality of cross shafts 59 are supported by the members 55 between the shafts 33 and 56 and are each provided with four grooved rollers 31' which are maintained in alignment with the sprocket wheels 57 and 58 by spacers 32'. The parts 31' and 32' correspond with and function in the same manner as the parts 31 and 32, respectively. Four chains 60 are trained over the complementary sprocket wheels 58 and 57 and at least the upper flights of said chains engage in the grooved rollers 31 which align with the sprocket wheels engaged by the chains.

As best seen in FIGURE 9, a latch segment 61 is fixed to the inner end of one of the frame members 55 and has an arcuate toothed edge 62 which is disposed concentric with respect to the shaft 33. A spring projected latch 63 is mounted on the frame member 29, located adjacent said latch segment 61, and selectively engages between the teeth of said latch segment for maintaining the elevator extension 54 at a desired angle relative to the elevator 28. When the machine 12 is not in use, the latch 63 can be retracted and the elevator extension 54 can be swung counterclockwise from its full line to its dotted line position of FIGURE 1, so that the free end thereof can then rest on the cross piece 21 of the rear arch member 17.

Drawbars 64 are swingably connected to and extend forwardly from the frame sides 14 and 15 and a drawbar 65 is swingably connected to and extends forwardly from the cross piece 21 of the front arch member 16. Said drawbars are connected for vertical swinging movement.

A portion of a conventional tractor 66 is illustrated in FIGURES 1, 2 and 3. Transversely spaced bracket members 67 are supported by and fixed to the rear axle housing 68 of the tractor. Each bracket member 67 includes a depending part 69. The forward ends of the lower drawbars 64 are detachably connected by fastenings 70 to the bracket portions 69 and the forward end of the upper drawbar 65 is detachably connected by a fastening 70 to an upstanding part 71 of the tractor.

The brackets 67 include rearwardly extending parts 72 each of which supports an upstanding bearing post 73. A shaft 74 is journaled in the bearing posts 73 and has belt pulleys 75 and 76 fixed thereto. The tractor 66 is provided with a rearwardly extending power take off shaft 77 to which a belt pulley 78 is secured. The belt pulley 78 is connected to the belt pulley 75 by an endless belt 79 for driving the countershaft 74 from the power takeoff shaft 77. A belt pulley 80 is fixed to the shaft 33 and an endless belt 81 is trained over the belt pulleys 76 and 80 to form a driving connection between the shaft 74 and the shaft 33 for driving the chains 45 of the elevator 28 and the chains 60 of the elevator extension 54.

The wheel 25 includes corresponding wheel sections 82 and 83 each having a hub 84 which is fixed to the shaft 27, a plurality of spokes 85 extending radially from the hub and a felly 86 which is fixed to and disposed around the outer ends of the spokes 85. As best seen in FIGURES 4 and 6, the fellies 86 are of substantial width and are provided around their inner edges with outwardly extending annular flanges which are outwardly tapered to form annular cutting blades 87.

A plurality of headed bolts 88 extend inwardly through and project from the inner side of each felly 86, said bolts being disposed in circumferentially spaced relation to one another and adjacent the blade 87. Bars 89 extend between the fellies 86 and have openings 90 adjacent the ends thereof for loosely engaging the transversely aligned bolts 88 of the two fellies 86 on inner sides of said fellies. Each bar 89 is provided with an outwardly extending flange 91, as best seen in FIGURE 7, which fits loosely between the fellies 86 and inner portions of the blades 87. A cross cutting blade 92 is detachably secured to each bar 91 by nut and bolt fastenings 93. The blades 92 extend between the blades 87 and the outer cutting edges thereof are disposed substantially coplanar with the adjacent edge portions of the blades 87, as seen in FIGURES 6 and 7. A clamping bar 94 is preferably disposed on the opposite side of each blade 92 to the supporting bar 91 thereof and is engaged by the fastenings 93 for clamping inner portions of the blades 92 between the bars 91 and 94. The inner portion of each bolt 88 carries a compression spring 95 between the bar end engaged by said bolt and a stop nut 96 which is adjustably mounted on the threaded inner end of the bolt for adjusting the pressure of the spring 95. Thus, each bar 89 and the blade 92 carried thereby is capable of individual inward yielding movement relative to the blades 87 and is also capable of limited yielding rocking movement relative to the bolts 88 and fellies 86.

As best seen in FIGURES 2 and 4, the forward cutting end 50 of the scoop blade 48 is disposed between the annular blades 87 and somewhat behind the bottommost portions thereof. The wheel 25 supports the entire weight of the forward part of the machine 12. Accordingly, when the machine 12 is pulled behind the tractor 66 from right to left of FIGURES 1 and 2, the annular blades 87 will cut into the sod over which the machine is moving and the rims or fellies 86 will rest on and compress the sod on the outer sides of the blades 87. The blades 87 will thus cut a longitudinal strip of sod which will be cut transversely by the cross blades 92 into rectangular pieces of uniform length and width. The cutting end 50 of the scoop blade 48 will cut under the sod behind the cutting blades 87 and 92 and will deflect the pieces of sod upwardly over the blade 48 and between the walls 36, after which each piece of sod will be engaged by the upwardly and rearwardly traveling upper flights of the chains 45. The pieces of sod, not shown, will be conveyed over the sprocket wheels 34 by the chains 45 and onto the upper flights of the chains 60 by which the sod pieces will be conveyed longitudinally of the rearwardly extending elevator extension 54 and discharged from the rear end thereof into the body of a wagon 97 or other load conveying vehicle being drawn behind the machine 12 and over which the rear portion of the elevator extension 54 is disposed. The machine frame 13 is preferably provided with a rearwardly extending drawbar 98 to which the tongue 99 of the wagon 97 is coupled, as seen in FIGURE 1, for pulling the wagon behind the machine 12. As previously pointed out, the elevator extension 54 can be angularly adjusted by the latch structure 61, 63 to vary the elevation of the rear end thereof to accommodate it to wagon bodies of different heights. The wheel fellies 86 by compressing the sod on the outer sides of the blades 87 will insure a clean, straight cutting of the sod to a uniform depth by the blades 87 and 92. The depth at which the sod is cut from beneath and consequently the cut thickness of the sod pieces can be varied by adjustment of the nuts 53 for slightly elevating or lowering the scoop blade 48.

Various modifications and changes are contemplated and may be resorted to, without departing from the function or scope of the invention as hereinafter defined by the appended claims.

I claim as my invention:

1. A sod cutting and elevating machine comprising an elongated frame, transversely spaced rear ground engaging wheels connected to and supporting the rear end of the frame, a single front ground engaging wheel journaled in and supporting a forward end of the frame, an elevator supported by and disposed longitudinally wtihin said frame and having a lower forward end disposed behind and adjacent the bottom portion of said front wheel, said front wheel including transversely spaced annular cutting blades and circumferentially spaced cross cutting blades extending between said annular blades for cutting sod over which the wheel travels into pieces of uniform sizes, said front wheel having load bearing rims straddling the annular blades and spaced radially inward from cutting edges of the annular blades and cross cutting blades, and a scoop blade connected to and extending downwardly and forwardly from said elevator and having a forward cuttingend adapted to undercut the sod pieces behind and adjacent the cutting blades of said wheel for deflecting the cut sod pieces upwardly and onto the lower end of the elevator.

2. In a sod cutting machine, a single front supporting wheel comprising transversely spaced wheel sections each including a wide felly, annular blades projecting radially outward from inner edges of said fellies and disposed in transversely spaced relation to one another, cross blades extending transversely between said annular blades and disposed in circumferentially spaced relation to one another, bars secured to said cross blades and having apertured end portions disposed on the inner sides of the wheel fellies, connecting elements secured to and extending radially inward from the wheel fellies and on which said apertured end portions have a loose fitting engagement for radial sliding and rocking movement of the bars and cross blades relative to said connecting elements, fellies and annular blades, and springs carried by said connecting elements and bearing against and yieldably urging said end portions radially outward and into engagement with the fellies for normally maintaining outer cutting edges of said cross blades in planes substantially coplanar with adjacent edge portions of the annular blades.

3. In a sod cutting machine, a ground engaging supporting wheel including transversely spaced load bearing rims, transversely spaced annular sod cutting blades fixed to and extending radially outward from said rims and disposed therebetween and in transversely spaced relation to one another, a plurality of circumferentially spaced cross cutting blades disposed between the annular cutting blades and crosswise thereof, and means supported by and projecting from inner sides of the rims and supporting the cross cutting blades for yielding movement radially inward of the wheel.

References Cited in the file of this patent
UNITED STATES PATENTS

| | | |
|---|---|---|
| 18,351 | Newman | Oct. 6, 1857 |
| 371,462 | Kennett | Oct. 11, 1887 |
| 487,935 | Nevel | Dec. 13, 1892 |
| 627,474 | Brouk | June 27, 1899 |
| 883,628 | Davis | Mar. 31, 1908 |
| 995,871 | Jass | June 20, 1911 |
| 1,010,260 | Hill | Nov. 28, 1911 |
| 1,025,764 | Posey | May 7, 1912 |
| 1,041,288 | Huber | Oct. 15, 1912 |
| 1,092,632 | Crain | Apr. 7, 1914 |
| 1,408,238 | Alles | Feb. 28, 1922 |
| 1,706,831 | Watson | Mar. 26, 1929 |
| 2,401,653 | Mohler | June 4, 1946 |
| 2,617,347 | Provost | Nov. 11, 1952 |
| 2,663,242 | Lancaster | Dec. 22, 1953 |
| 2,756,661 | Frisbie et al. | July 31, 1956 |

FOREIGN PATENTS

| | | |
|---|---|---|
| 473,850 | Great Britain | Oct. 21, 1937 |